United States Patent [19]

Matty

[11] Patent Number: 4,620,143

[45] Date of Patent: Oct. 28, 1986

[54] DIGITAL PULSE WIDTH MODULATION MOTOR CONTROL SYSTEM

[75] Inventor: Thomas C. Matty, N. Huntingdon Township, Irwin County, Pa.

[73] Assignee: Westinghouse Electric Corp., Pittsburgh, Pa.

[21] Appl. No.: 670,423

[22] Filed: Nov. 9, 1984

[51] Int. Cl.⁴ .................. H02P 5/40; H02M 5/458
[52] U.S. Cl. ................................ 318/811; 363/41
[58] Field of Search ............... 364/721, 718; 331/117; 361/156; 318/821, 803, 807–810; 363/40–43

[56] References Cited

U.S. PATENT DOCUMENTS 3,346,794 10/1967 Stemmler ..................... 318/810
4,328,525  5/1982 Allen et al. ................... 331/117 R
4,333,042  6/1982 Kawada et al. ................ 318/811
4,485,355 11/1984 Scott ............................. 331/117 R Primary Examiner—David Smith, Jr.
Attorney, Agent, or Firm—E. F. Possessky

[57] ABSTRACT

An adjustable frequency AC motor drive control system includes pulse width modulation control of an inverter coupled with the motor and a programmed microprocessor which generates a cosine wave in cooperation with a sine wave and a carrier wave to provide a synthesized sine wave voltage to the motor by controlling the conduction of power switches at a rate higher than the fundamental frequency of the sine wave voltage output.

9 Claims, 11 Drawing Figures

DIGITAL PULSE WIDTH MODULATION MOTOR CONTROL SYSTEM

BACKGROUND OF THE INVENTION

It is known in the prior art to generate pulse width modulated control signals for an inverter coupled with a load, such as an AC induction motor, to provide a synthesized AC sine wave voltage output to that load, as set forth at pages 15-39 to 15-42 of the Electronic Engineers Handbook published in 1975 by McGraw-Hill Book Company. It is known to vary the DC input voltage and the pulse width control for determining the output voltage applied to the load.

It is known to generate a synthesized sine wave of voltage output for energizing one phase of a three-phase AC motor and providing suitable 120 degree phase shifting of that output for energizing the other phase of the motor, as described in U.S. Pat. No. 4,099,109 of A. Abbondanti.

The optimum voltage wave form to energize an AC motor is a sine wave. At the present time it is not practical to provide a linear amplifier to develop the power level required by many AC motors, a switching mode can be employed to provide the desired voltage control and power level for the AC motor load. A sine wave form is chopped by a sawtooth or triangular carrier wave that determines the output voltage wave form applied to the converter coupled with the motor. The motor is energized with a voltage that is synthesized from a pulse width modulated series of pulses.

SUMMARY OF THE INVENTION

An algorithmic control operation for an AC motor is provided in relation to the provision of a sine wave form in cooperation with a cosine wave form to generate pulse width modulated output signals for establishing a synthesized output sine wave of voltage for application to each phase of an AC induction motor. At least one of the motor voltages or the motor frequency is controlled by pulse width modulation in response to a parameter such as motor current or motor frequency to maintain a desired motor current relationship for the motor.

DESCRIPTION OF A PREFERRED EMBODIMENT

Figure 1:
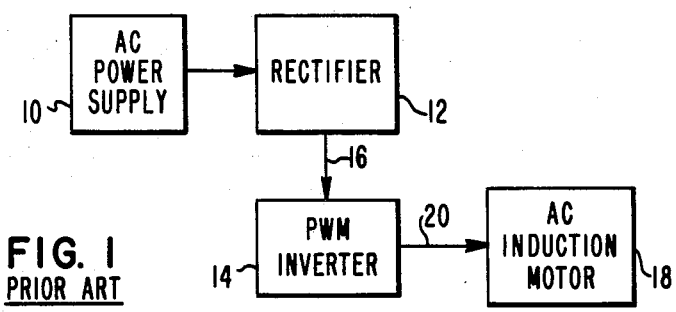
FIG. 1 shows a prior art PWM inverter coupled with an AC induction motor.

In FIG. 1 there is shown an AC power supply 10, such as a well known 60 Hz AC source, connected through a rectifier 12 to an inverter 14 which pulse width modulates the DC voltage on line 16 to energize an AC induction motor 18 with a synthesized sine wave output voltage on line 20.

Figure 2:
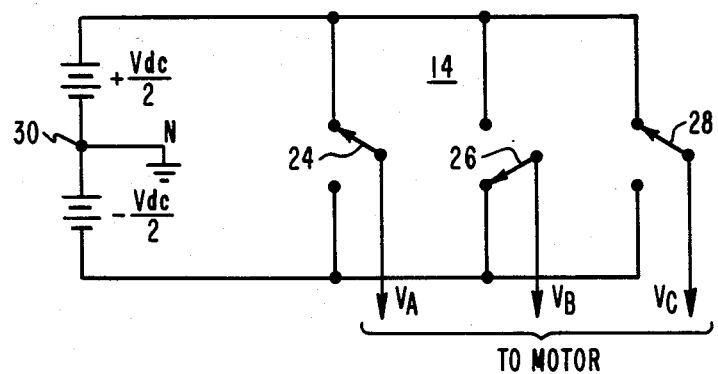
FIG. 2 shows the respective pole switches of a prior art three-phase inverter coupled with an AC motor.

In FIG. 2, the inverter 14 is shown as including three pole switches 24, 26 and 28 for the respective three phases of the AC motor 18. Each of these pole switches can include controlled rectifiers such as thyristors or gate turn off thyristors. The DC voltage from the rectifier 12 is shown in FIG. 2 as two batteries having a common junction 30 that is connected to ground potential.

Figure 3:
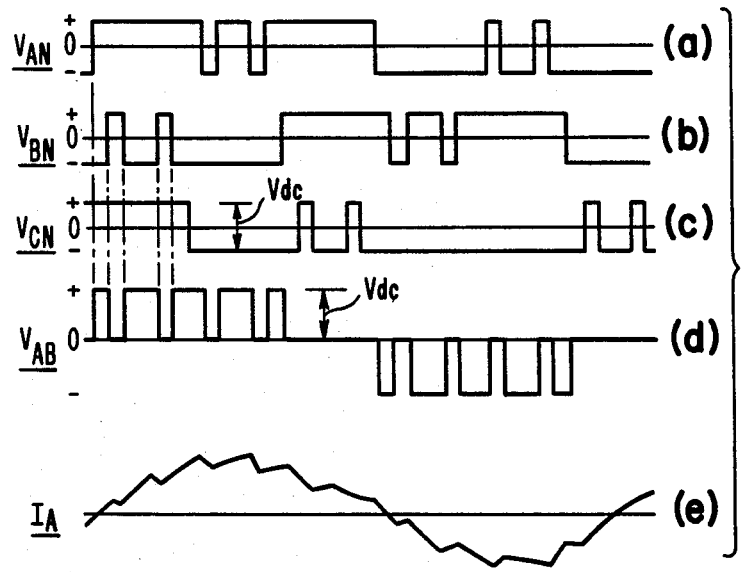
FIG. 3 illustrates the voltage wave forms of a prior art modulator using the triangulation method of synthesizing three-phase output voltage wave forms.

In FIG. 3 there is shown the three typical line-to-DC link neutral voltages VAN, VBN and VCN such as would be provided for the three motor poles A, B and C. One of the line-to-line voltages VAB is shown provided by the line-to-neutral voltages VAN and VBN. Although this output voltage waveform is substantially different than a sine wave, the inductance of the motor 18 smooths out the pulses so the motor current approximates a sine wave as shown by curve $I_A$. The synthesized output voltage applied to the motor is controlled by the pulse width modulation of the output voltages VAN, VBN, and VCN.

Figure 4:
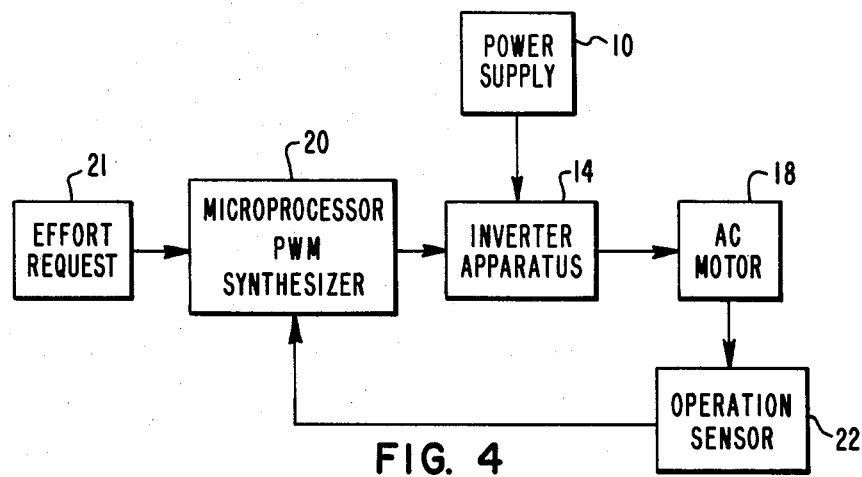
FIG. 4 shows a block diagram of an AC motor control apparatus in accordance with the present invention.

In FIG. 4 there is shown a microprocessor PWM synthesizer 20 responsive to an input effort request 21 for determining the operation of the inverter 14 for energizing an AC motor 18. The operation sensor 22 provides a motor operation feedback signal to the synthesizer 20.

Figure 5:
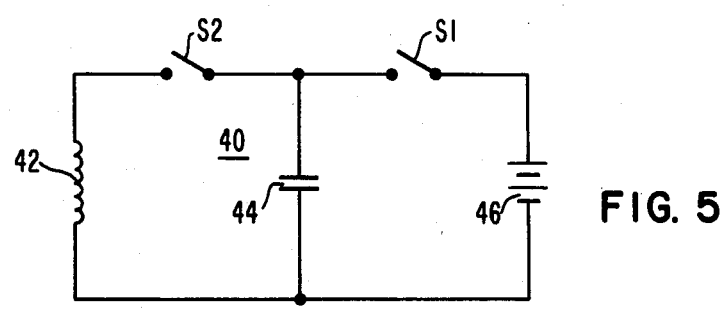
FIG. 5 shows a DC voltage source coupled to charge a capacitor and an inductive load coupled to discharge that capacitor.

In FIG. 5 there is illustrated the algorithmic generation of a sine wave and a cosine for providing a synthesized output sine wave for controlling an AC motor. An LC circuit 40 is shown including inductance 42, capacitor 44, a voltage source 46 such as a battery, a first switch S1 and a second switch S2. The first switch S1, when closed, builds up a known voltage charge on the capacitor 44. Then the first switch S1 is opened and the second switch S2 is closed at time T equal to zero so the voltage across the capacitor 44 will discharge through the inductance 42 for generating a cosine voltage wave in relation to the capacitor 44 while the current through the inductor 42 and the rest of the circuit will generate a current sine wave. The voltage on the capacitor 44 is equal to the reciprocal of the capacitance times the integral of the current as a function of time as follows:

$$V = \frac{1}{C} \int I \, dt \tag{1}$$

The current in the inductor is the reciprocal of the inductance times the integral of the voltage as a function of time as follows:

$$I = \frac{1}{L} \int E \, dt \quad (2)$$

The above integral equation (1) can be expressed as a series of mathematical summation as follows:

$$V = \frac{1}{C} \Sigma I \Delta t \quad (3)$$

The above integral equation (2) can be expressed as follows:

$$I = \frac{1}{L} \Sigma V \Delta t \quad (4)$$

The above voltage relationship permits the generation of a cosine wave form and the above sine relationship permits the generation of a sine wave form.

A basic language program using the above relationships can operate with the microprocessor PWM synthesizer 20 to provide a synthesized pulse width modulated output control signal for the pole switches of the inverter 14 in accordance with a desired sine wave relationship for the energization and control of the AC motor 18.

| EXAMPLE PROGRAM | |
|---|---|
| 30 | HI = 10:LO = 0 |
| 40 | MAX = 100:MIN = 0:K = 1 |
| 50 | V = 100:I = 0:DT = $\frac{1}{12 * LC}$ |
| 100 | REM START |
| 110 | V = V − I DT/C |
| 120 | I = I + V * DT/L |
| 130 | TR = TR + K * DT |
| 140 | IF TR > MAX THEN TR = MIN |
| 150 | IF V >TR THEN OUT = HI ELSE OUT = LO |
| 160 | GO TO 100 |

Figure 6:
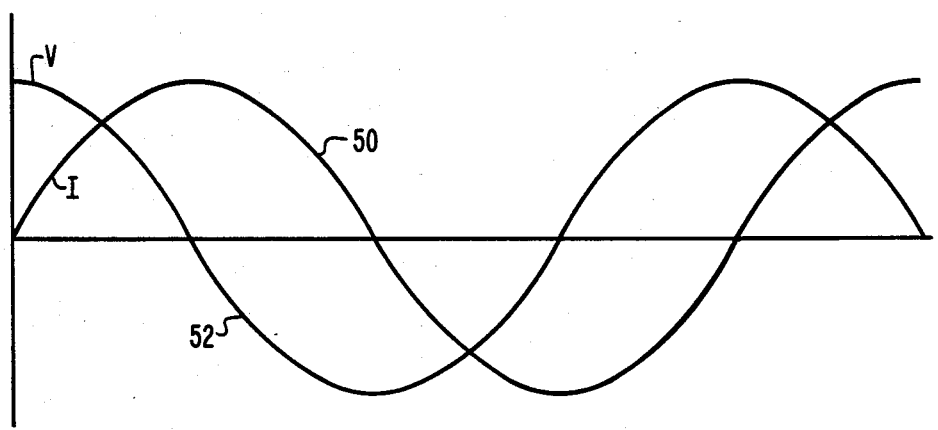
FIG. 6 shows the discharge voltage wave form and the discharge current wave form provided in relation to FIG. 5.

For example, at line 50 the voltage is set equal to 100 and the current is set equal to zero as shown in FIG. 6 for respectively the voltage wave 50 and the current wave 52. The time period delta time or DT is set for the reciprocal of 12 times the square root of the inductance L times the capacitance C. This provides a time period less than a function of the natural resonance of the product of the inductance and the capacitance, which establishes the natural frequency of the circuit shown in FIG. 5. The voltage in line 110 is set equal to the previous voltage plus the current times DT/C in accordance with above equation (3). The current in line 120 is set equal to the previous current plus the voltage times DT/L in accordance with above equation (4). The carrier wave TR in line 130 is set equal to the previous carrier wave value plus some constant times DT. If the carrier wave TR in line 140 becomes greater than a predetermined maximum value, then set TR equal to a predetermined minimum value. In addition, if the voltage wave 52 in line 150 becomes greater than the carrier wave 56, then the output voltage signal goes high, and otherwise the output voltage signal goes low. A loop operation is provided at line 160.

Figure 7:
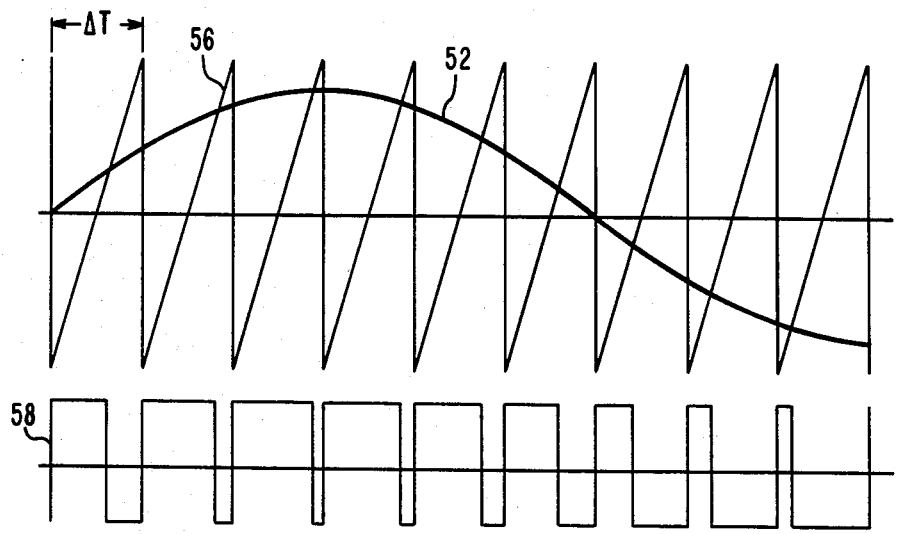
FIG. 7 shows a generated sawtooth carrier wave operative with a generated sine voltage wave form to provide a PWM synthesized output control voltage signal for controlling the voltage energization of one phase pole of an inverter.

In FIG. 7, the voltage wave 52 is shown in relation to a carrier wave 56. The output voltage signal 58 to an inverter pole switch is determined by the carrier wave 56 being less than or greater than the voltage wave 52. When the voltage 52 is greater than the carrier 56, the output 58 is high and when the voltage 52 is less than the carrier 56, the output 58 is low. This operation keeps repeating as a function of time.

Figure 8:
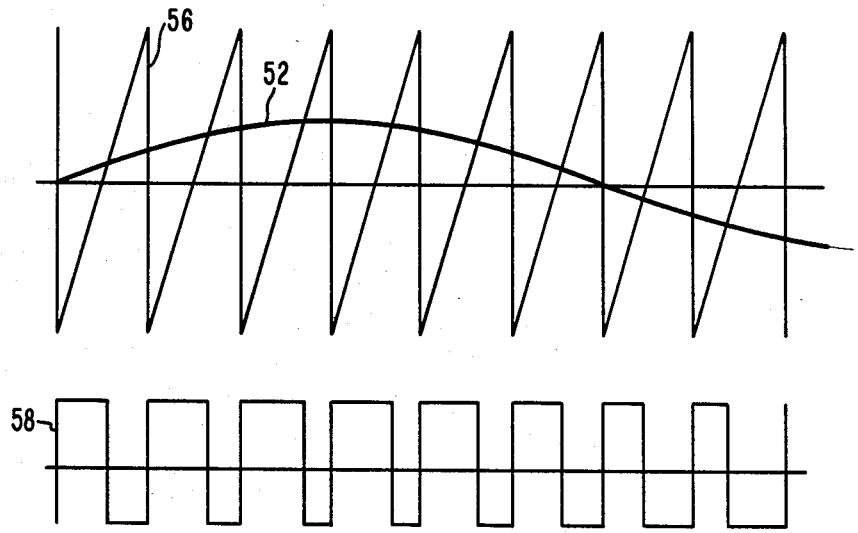
FIG. 8 shows the PWM result of providing a lower amplitude voltage sine wave with the same frequency carrier wave of FIG. 7 to modify the synthesized PWM output control voltage signal.

In FIG. 8, there is shown the change in output 58 when the magnitude of the voltage wave is decreased as compared to FIG. 7.

Figure 9:
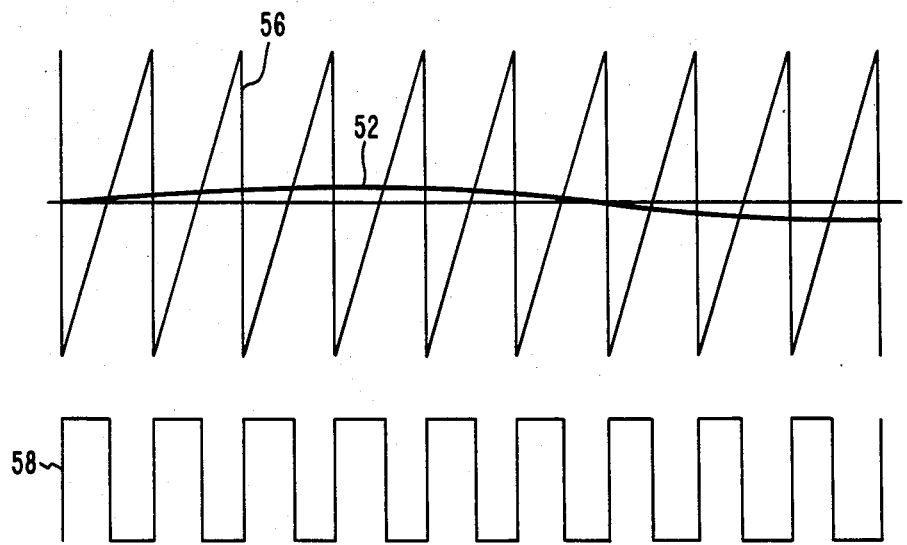
FIG. 9 shows the PWM result of providing a still lower amplitude voltage sine wave with the same frequency carrier wave of FIG. 7.

In FIG. 9, there is shown the change in output 58 when the voltage wave 52 approaches zero as compared to the magnitude shown in FIG. 7.

Figure 10:
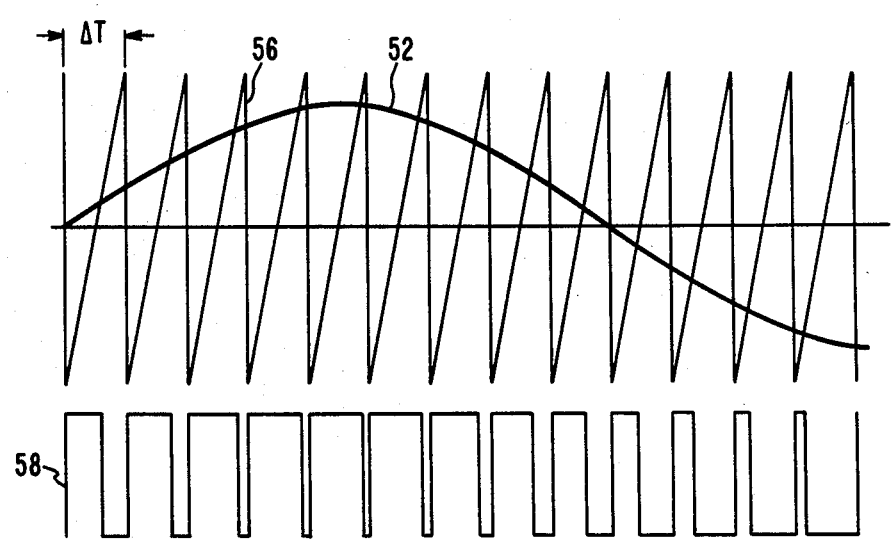
FIG. 10 shows the PWM result of providing a higher frequency carrier wave with the same amplitude voltage sine wave of FIG. 7.
Figure 11:
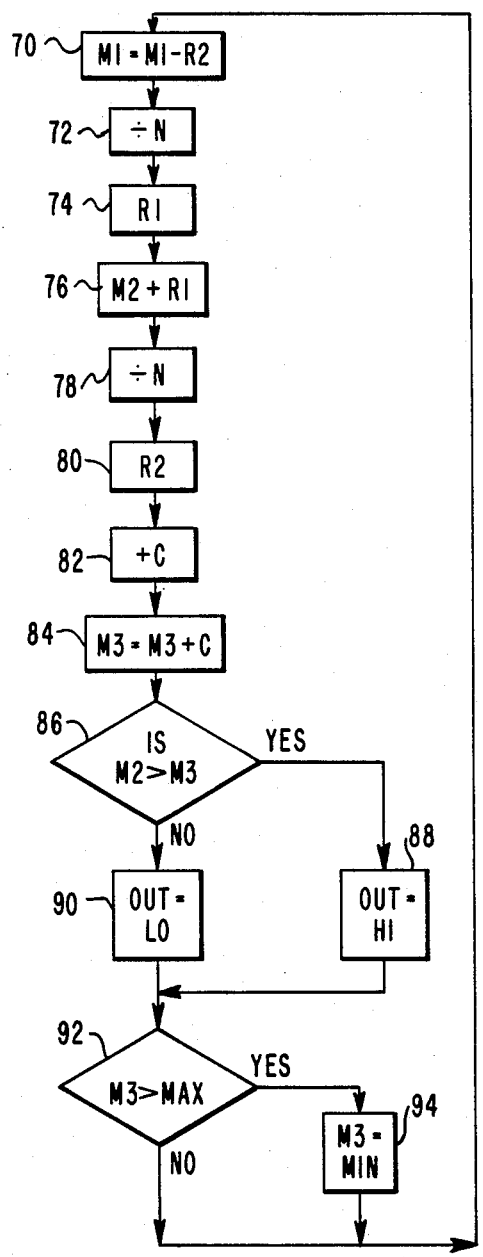
FIG. 11 shows a flow chart to illustrate the operation of the programmed microprocessor in accordance with the present invention.

In FIG. 10, there is shown the change in output 58 when the delta time or DT time period of the carrier 56 is decreased as compared to the time period shown in FIG. 7.

In the above basic program, line 110 is the cosine function generator and line 120 is the sine function generator. The line 130 is the carrier wave generator and the constant K determines the frequency of the carrier wave. The line 150 outputs one of a high or low for connection to each of the respective switches of a converter pole. The microprocessor clock frequency and the number of instructions in the program loop establishes the run time required for this program.

If it is desired to also change the motor torque by change of the output voltage applied to the motor, an instruction can be included to correspondingly adjust the assigned value of the cosine in line 50 of the above example program, such that V=150 in some other desired value and make a check each time the calculated cosine wave goes through zero to see if a new voltage amplitude request has been provided for this purpose. As the resulting sine wave is reduced toward zero, such as shown in FIG. 9, the output wave from approaches a 50% conduction for each of the pole switches and the provided effective voltage to the motor approaches zero, and as the sine wave magnitude increases to that shown in FIG. 8 and to that shown in FIG. 7, the output motor voltage increases.

An AC motor can operate inefficiently at light load operation and it is desired to reduce the output voltage applied to that motor for this condition to make the motor operation more efficient. In addition, it is desired to reduce the motor frequency by providing a delay between the successive changes in the sine wave value to make the no-load or light load motor operation more efficient. The motor operation can be maintained at a higher efficiency by increasing the time between changes in the sine wave determined in accordance with the present invention. By sensing the motor current the no-load or light-load operation of the motor can be distinguished from the full-load operation of the motor, and this can be used to control the motor voltage to slow the motor operation such that the no-load current is thereby reduced. If desired, the frequency can be reduced to make the motor operation more efficient for a no-load and light-load operation of the motor in response to the sensed motor current.

As shown in FIG. 10 a microprocessor can be programmed to generate a sine wave using algorithmic operations providing a cosine function and a sine function. An initial numerical value is loaded into a first register M1, the value in M1 is divided by a predetermined number, then the result R1 is added to a second register M2 and the result R2 is subtracted from the first register M1. This operation is repeated successively to generate the cosine wave as the successive values of M1 and the sine wave as the successive values of M2, with the quality of that sine wave being a function of the division ratio N. In block 70, the first memory register M1 is loaded with the desired cosine wave voltage, which could be the V=100 of the above example program. The value of register M1 is now divided by a predetermined number selected in accordance with the desired motor constraints, and this number is shown in block 72 as 2, so the result of R1 of this division shown in block 74 would be 50. The result R1 is added in block 76 to the value in the second register M2 which second memory register M2 was loaded with zero corresponding with the I=0 of the above example program, and the sum is divided by the same number 2 in block 78 to give in block 80 the result R2 of 25, which is subtracted in block 70 from the value in the first register M1 to give M1 a difference of 75 for the next run. The following table shows the first run, the second run, the third run and the fourth run of this program.

mum, the operation loops back to block 70 to determine a new value for M1.

In Appendix A is shown a program for a Z80 microprocessor such as provided in a TRS 80 computer that operates substantially in accordance with the above example program, and computes the sine wave increment, computes the cosine wave increment, computes the carrier and then compares the sine increment with the carrier to determine either the output of a high or the output of a low for controlling the converter coupled with the AC motor load.

In Appendix B is shown a program that includes skipping a few updates of the sine increment while maintaining the same frequency for the carrier wave. This could be desired for providing a higher efficiency of motor operation by reducing the frequency of the sine wave to control the motor operating frequency.

GENERAL DESCRIPTION OF INSTRUCTION PROGRAM LISTING

In the Appendix there are included instruction pro-

| BLOCK | FIRST RUN | SECOND RUN | THIRD RUN | FOURTH RUN | FIFTH RUN | SIXTH RUN |
|---|---|---|---|---|---|---|
| 70 | 100 | 75 | 31.2 | −20.4 | −66.9 | −96.6 |
| 74 | 50 | 37.5 | 15.6 | −10.2 | −33.5 | −48.3 |
| 76 | 50 | 87.5 | 103.1 | −92.9 | 59.4 | 11.1 |
| 80 | 25 | 43.8 | 51.6 | 46.5 | 29.7 | 5.6 |

In FIG. 10 at block 82 is a number C that is added to the contents of register M3 at block 84 to establish the carrier wave TR. In block 86 a check is made to see if the sine wave M2 is greater than the carrier wave M3, such as shown in FIG. 6 when the output control voltage is high. At block 88, if the sine wave M2 is greater than the carrier wave M3, then the output motor control voltage is high. If the sine wave M2 is not greater than the carrier wave M3, the output control voltage is low at block 90. At block 92 a check is made to see if the carrier wave M3 is greater than a predetermined maximum value, and if yes, then at block 94 the carrier wave M3 is set to a predetermined minimum value. If the carrier wave M3 is not greater than the desired maxigram listings that can be executed on the Z80 microprocessor computer system. This instruction is included to provide an illustration of one suitable embodiment of the present motor control system that has actually been prepared. This instruction program listing at the present time is a more or less development program and has not been extensively debugged through the course of practical operation controlling a load such as the doors of a transit vehicle. It is well known by persons skilled in this art that real time process control application programs may contain some bugs or minor errors and it is within the skill of such persons and takes varying periods of actual operation time to identify and routinely correct the more critical of these bugs.

```
File = PWM3/SRC    LRL = 256           REC = ASCII

SPWM3   00090                           ;PWM GENERATOR
00100   ORG     8000H
00110 SIN       EQU     9110H
00120 COS       EQU     9100H
00130 TRI       EQU     9000H
00140   LD      A,80H       ;LOAD INITIAL VALUES
00150   LD      (TRI),A
00160 LP1       LD      HL,4000H
00170   LD      (COS),HL
00180   LD      HL,0
00190   LD      (SIN),HL
00200 LP2       LD      HL,(COS) ;COMPUTE SIN INCREMENT
00210   SRA     H
00220   RR      L
00230   SRA     H
00240   RR      L
00250   SRA     H
00260   RR      L
```

```
00270        SRA      H
00280        RR       L
00290        SRA      H
00300        RR       L
00310        LD       D,H
00320        LD       E,L
00330        LD       HL,(SIN)
00340        ADD      HL,DE
00350 LP3    LD       (SIN),HL ;STORE NEW SIN
00360        SRA      H        ;COMPUTE COS INCREMENT
00370        RR       L
00380        SRA      H
00390        RR       L
00400        SRA      H
00410        RR       L
00420        SRA      H
00430        RR       L
00440        SRA      H
00450        RR       L
00460        LD       B,H
00470        LD       C,L
00480        LD       HL,(COS)
00490        OR       A
00500        SBC      HL,BC
00510        LD       (COS),HL ;STORE NEW COS
00520 LP4    LD       A,(TRI)  ;COMPUTE CARRIER
00530        ADD      A,8
00540        CP       0C0H
00550        JP       M,SK1
00560        LD       A,40H
00570 SK1    LD       (TRI),A
00580        CP       H        ;COMPARE SIN WITH CARRIER
00590        JP       M,SK2
00600        LD       A,2      ;OUTPUT HI
00610        OUT      (255),A
00620        JP       LP2
00630 SK2    LD       A,1      ;OUTPUT LO
00640        OUT      (255),A
00650        JP       LP2
00660        END      8000H
```

File = PWM/S    LRL = 256          REC = ASCII

```
SPWM   00100                       ;PWM GENERATOR
00110       ORG      8000H
00120 SIN   EQU      9000H
00130 COS   EQU      9010H
00140 TRI   EQU      9020H
00150 DLY   EQU      9030H
00160 TI    EQU      9040H
00170 NCY   EQU      9050H
00180       LD       A,80H   ;LOAD INITIAL VALUES
00190       LD       (TRI),A
00200       LD       (TI),A
```

```
00210       LD       (DLY),A
00220       LD       HL,1000H
00230       LD       (COS),HL
00240       LD       HL,0
00250       LD       (SIN),HL
00260 LP2   LD       A,(DLY) ;CHECK TIME DELAY
00270       DEC      A
00280       LD       (DLY),A
00290       JP       NZ,LP4  ;SKIP TO CARRIER
00300       LD       A,(TI)
00310       LD       (DLY),A
00320       LD       A,(NCY) ;DETERMINE COMPLETE CYCLE
00330       DEC      A
00340       LD       (NCY),A
00350       JP       NZ,LP1  ;CYCLE NOT COMPLETE
00360       LD       A,(TI)  ;CYCLE COMP INC FREQ
00370       DEC      A
00375       CP       03H
00376       JP       Z,SKC
00380       LD       (TI),A
00390 SKC   LD       A,200
00400       LD       (NCY),A
00440 LP1   LD       HL,(COS);COMPUTE SIN INCREMENT
00450       SRA      H
00460       RR       L
00470       SRA      H
00480       RR       L
00490       SRA      H
00500       RR       L
00510       SRA      H
00520       RR       L
00530       SRA      H
00540       RR       L
00550       LD       D,H
00560       LD       E,L
00570       LD       HL,(SIN)
00580       ADD      HL,DE
00590 LP3   LD       (SIN),HL;STORE NEW SIN
00600       SRA      H       ;COMPUTE COS INCREMENT
00610       RR       L
00620       SRA      H
00630       RR       L
00640       SRA      H
00650       RR       L
00660       SRA      H
00670       RR       L
00680       SRA      H
00690       RR       L
00700       LD       B,H
00710       LD       C,L
00720       LD       HL,(COS)
00730       OR       A
00740       SBC      HL,BC
00750       LD       (COS),HL;STORE NEW COS
00760 LP4   LD       A,(TRI) ;COMPUTE CARRIER
00770       ADD      A,8
00780       CP       0C0H
```

```
00790      JP     M,SK1
00800      LD     A,40H
00810 SK1  LD     (TRI),A
00820      CP     H          ;COMPARE SIN WITH CARRIER
00830      JP     M,SK2
00840      LD     A,2        ;OUTPUT HI
00850      OUT    (255),A
00860      JP     LP2
00870 SK2  LD     A,1        ;OUTPUT LO
00880      OUT    (255),A
00890      JP     LP2
00900      END    8000H
           H
0
```

I claim:

1. In apparatus for controlling the energization of a load through an inverter coupled with a power supply, the combination of first means generating a cosine function by successively providing a first value and generating a sine function by successively providing a second value, with the first value being provided in accordance with the second value and the second value being provided in accordance with the first value, second means generating a carrier wave by successively providing a third value, with a predetermined time period being provided between each of the successive third values such that one of a sawtooth or a triangular carrier wave is established, and third means comparing one of the first and second values with said third value for providing successive output signals for controlling said inverter to determine the energization of said load.

2. The apparatus of claim 1, with said cosine function being a voltage relationship to a predetermined capacitance and with the sine function being a current relationship to a predetermined inductance.

3. The apparatus of claim 1, with at least one of the cosine function and the sine function having a frequency determined by a predetermined time delay between successive values of that one function.

4. The apparatus of claim 1, including means sensing the current of said load for determining the magnitude of said values of at least one of the cosine and sine functions.

5. The apparatus of claim 1, with the magnitude of the cosine function values and said time period of the carrier wave being determined by the known operational characteristics of said load.

6. The apparatus of claim 1, with said output signal having a high value when said one of the first and second values is greater when compared with the third value and having a low value when the third value is greater when compared with said one of the first and second values.

7. The apparatus of claim 1, with the successive output signals establishing a synthesized sine wave as a pulse width modulated series of pulses to determine the energization of said load.

8. The apparatus of claim 1, with the first means including a microprocessor having first and second memories operative such that the successive first values are generated in the first memory and the successive second values are generated in the second memory.

9. The apparatus of claim 1, with the first means including first and second memories of a microprocessor operative to generate the successive first values in the first memory and to generate the successive second values in the second memory, and with the second means including a third memory of said microprocessor operative to generate the successive third values in the third memory.

* * * * *